United States Patent [19]

Scheetz et al.

[11] 3,911,786
[45] Oct. 14, 1975

[54] ORDNANCE ALIGNMENT AND LOADING APPARATUS

[75] Inventors: Frank L. Scheetz, New Hope; Francis E. Buck, Warminster; William B. Shepard, North Wales, all of Pa.

[73] Assignee: The United States of America as represented by the Secretary of the Navy, Washington, D.C.

[22] Filed: Dec. 26, 1973

[21] Appl. No.: 428,533

[52] U.S. Cl. .............................. 89/1.5 R; 244/137 R
[51] Int. Cl.² .......................... B64D 7/00; B64D 9/00
[58] Field of Search ............. 89/1.5 R, 1.5 A, 1.5 B, 89/1.5 C, 1.5 D, 1.5 G, 1.5 H; 244/137 R

[56] References Cited
UNITED STATES PATENTS

| | | | |
|---|---|---|---|
| 2,613,822 | 10/1952 | Stanley | 244/137 R |
| 3,086,753 | 4/1963 | Cushman | 89/36 C |
| 3,089,387 | 5/1963 | Damm | 89/1.5 R |

*Primary Examiner*—Stephen C. Bentley
*Attorney, Agent, or Firm*—R. S. Sciascia; Henry Hansen

[57] ABSTRACT

Apparatus for automatic final alignment and latching of ordnance to aircraft including a pair of diagonally opposed pin and cone sets demountably attached to the ordnance and aircraft respectively, lug and latch sets similarly attached, and a pair of inflatable bags supporting a platform on which the ordnance rests. Upon completion of approximate alignment, a lifting force is imparted to the weapons by inflation of the bags, causing smooth mating of the pins and cones and final fastening of the lugs and latches.

8 Claims, 3 Drawing Figures

ORDNANCE ALIGNMENT AND LOADING APPARATUS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to the field of ordnance loading and more particularly to final alignment apparatus utilizing pins and cones to automatically guide the ordnance to a final latched position.

High performance requirements of present and planned-carrier based aircraft have resulted in increased weapons carrying capability, which has materially affected aircraft rearming operations. Present Navy aircraft, such as the A-6 and A-7, carry up to 18,000 pounds of ordnance, including as many as thirty different types, some of which weigh in excess of 2,000 pounds each. This large volume and variety of weapons that must be loaded, coupled with the desirable goal of minimizing total aircraft turnaround time, has placed strenuous demands on ordnance handling personnel. To meet critical loading time allowances, large numbers of ordnance personnel are required to work long and hard under various types of adverse conditions, sometimes waiving established safety requirements in the interest of conserving time.

The majority of aircraft rearming, including final alignment and latching of the ordnance to the aircraft, is performed manually because of the lack of automated equipment to rapidly and efficiently perform the necessary functions. Presently, as many as fifteen sailors are engaged in manually hoisting and attaching an ordnance ejector rack containing six large bombs to an aircraft, sometimes under adverse weather conditions and hostile action. Some limited mobile automated weapons loading equipment is available to Navy personnel, but even when such equipment is used, final alignment prior to latching the ordnance to the aircraft must be performed manually. Such mobile weapons loaders are, in any case, more useful at stationary, land-based installations than on a small, heaving carrier deck. A series of rearming stations at various key locations aboard a carrier have been studied and found to be feasible for the purpose of decreasing ordnance loading time, decreasing the amount of ordnance loading personnel, and improving the overall safety and human engineering aspects of aircraft rearming.

SUMMARY OF THE INVENTION

Accordingly it is a general purpose and object of the present invention to provide a novel, reliable, simple and reusable apparatus for achieving automated final alignment and latching of weapons to aircraft. It is a further object to provide apparatus for automated final alignment and latching of weapons to carrier-based aircraft on a heaving deck.

These and other objects are accomplished according to the present invention by apparatus comprising expansion means supporting a platform and attached to a pivotable lifting means for raising ordnance receiving means having ordnance and carrying means attached thereto, and having pin means detachably mounted thereon formed to be guidingly inserted into receptacle means detachably mounted on an aircraft. Upon actuation of the expansion means, lug means mounted on the ordnance receiving means engage latch means mounted on the aircraft for final latching of the ordnance to the aircraft.

DESCRIPTION OF THE PREFERRED EMBODIMENT

Figure 1:
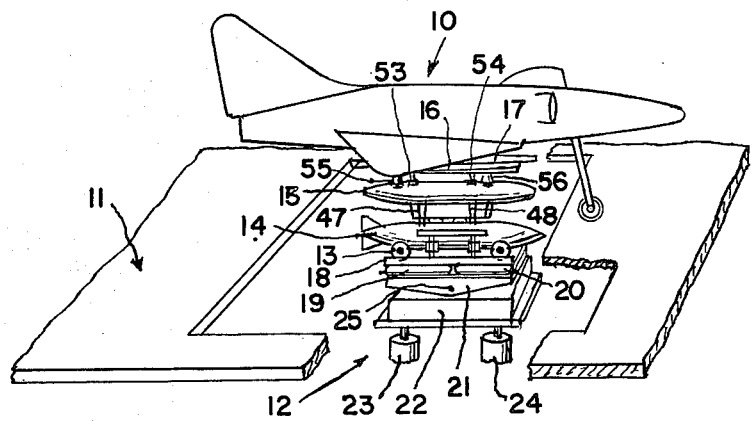
FIG. 1 is a perspective view, partially cut away of an ordnance rearming station on an aircraft carrier including the novel alignment and loading apparatus.

Referring to FIG. 1, an aircraft 10 is shown above a cut away portion of an aircraft carrier deck 11 at a rearming station 12 extending beneath deck 11. The aircraft noseweel is located on deck 11 in position wherein a mobile weapons skid 13 having some form of ordnance 14, such as a bomb, resting thereon and an ejector rack 15 rigidly supporting the bomb is directly under an ejector bomb rack 16 attached to a pylon 17 on aircraft 10. Ejector rack 15 with bomb 14 depending therefrom is in approximate position for elevation and final alignment and connection to bomb rack 16. Skid 13 rests on a skid platform 18 slidingly supported by a pair of expandable or inflatable bags 19 and 20 slidingly attached to a support fixture 21. Fixture 21 is pivotally attached at the bottom thereof to a lift table 22 capable of vertical movement by means of a pair of hydraulic cylinders 23 and 24, or any equivalent lifting means, for raising the entire apparatus toward the aircraft wing.

Figure 2:
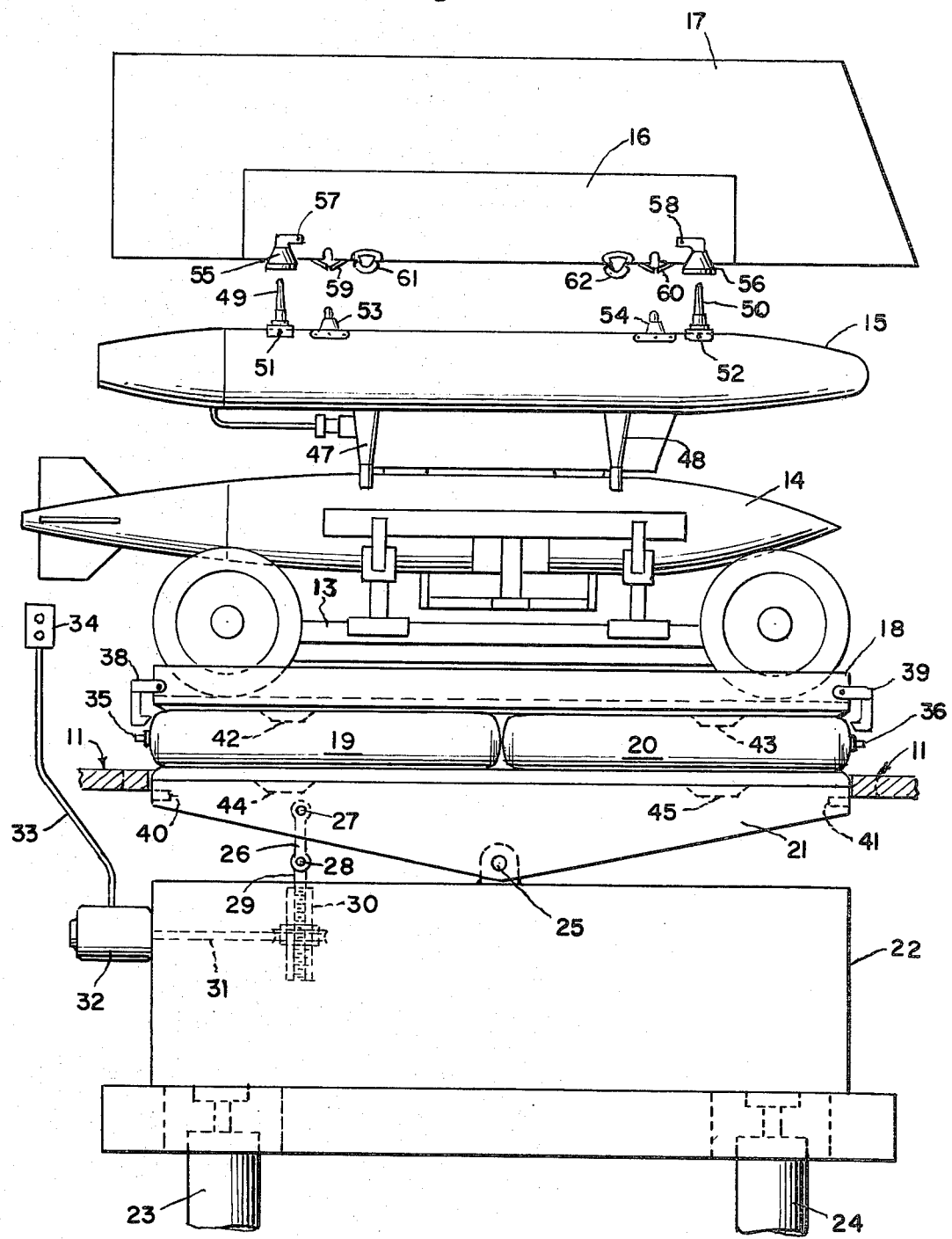
FIG. 2 is a side elevational view of a preferred embodiment of the apparatus of FIG. 1.

Referring now to FIG. 2, the novel final alignment and loading apparatus is shown enlarged and in greater detail. Cylinders 23 and 24 support the bottom of lift table 22 for selective raising and lowering thereof. Table 22 is pivotally connected at a pivot point 25 to the bottom of support fixture 21, which is free to rotate thereabout in a fore and aft direction. A link 26 is pivotally connected at one end to a point 27 on support fixture 21, and pivotally connected at the other end to a point 28 on an externally threaded rod 29 anchored in table 22. A sleeve 30, threaded both internally and externally, engages threads at the bottom of rod 29 and is free to rotate therearound. A shaft 31, threaded at one end, extends into lift table 22 in a direction transverse to rod 29, with the threaded end thereof engaging the external threads on sleeve 30 forming a worm gear. Shaft 31 is driven by a motor 32 mounted on an external surface of table 22 and connected by a cable 33 to a remote control switch 34. Upon selective actuation of switch 34, motor 32 rotates shaft 31 engaging sleeve 30 and selectively raising or lowering rod 29 and link 26. It is to be understood that motor 32 may be powered by any means of energy such as electrical, hydraulic or pneumatic means, or even replaced by manual means for turning shaft 31. Support fixture 21 thereupon rotates about pivot 25 causing it to assume variable fore and aft pitch attitudes relative to the various types of aircraft to be loaded. It is to be further understood, although not explicitly shown in the drawings, that similar apparatus is employed for lateral roll, and yaw correction, as well as lateral translation in two directions.

Due to the wide variations in configuration of Navy aircraft, fore and aft pitch can vary from -7 to +10°, lateral roll from −7° to +7°, and yaw from −2.5° to +2.5°.

It is necessary that the above corrections be made prior to final alignment and latching or ordnance 14 to aircraft 10 in order to reduce friction and excessive loading, as will be more fully described hereinafter. Fixture 21 therefore has six degrees of freedom (not shown).

Bags 19 and 20 are placed side by side and are slidingly attached to the top surface of fixture 21 in some convenient manner, such as by attaching straps (not shown) on bags 19 and 20 to tie downs (not shown) on fixture 21, or some equivalent method. Bags 19 and 20 each contain respective valves and stems 35 and 36 for filling and exhausting gas on the external surfaces thereof. Bags 19 and 20 are inflated from an existing low pressure air supply on the carrier deck, or from any other available gas supply source. The bags used in the present invention are each approximately 5 inches by 30 inches by 30 inches, and are made from nylon cloth with a weight of approximately 7 to 7.7 ounces per square yard with no internal ribs. The present invention should not be construed to be limited to the above-described dimensions or material. Any equivalent material could be used which possesses the strength necessary to support the load placed upon bags 19 and 20, and toughness to withstand abrasion. Other means for imparting a vertical force to an object resting on bags 19 and 20, such as hydraulic, pneumatic, or mechanical means, or any combinations thereof, are available and could be used in the present invention. The herein described inflatable bags 19 and 20 have the advantages of reliable, simple construction, are a readily available standard supply item, and utilize existing low pressure air which is conveniently available on the deck of an aircraft carrier. Bags 19 and 20 are each shown in a partially deflated condition in FIG. 2. When fully inflated, they produce 2 to 4 inches of vertical lift. Bags 19 and 20 support skid platform 18 whose surface is co-linear with carrier deck 11 when bags 19 and 20 are fully deflated. When bags 19 and 20 are fully deflated, platform 18 and support fixture 21 are locked together by a pair of locking devices 38 and 39 mounted on platform 18 and formed to be inserted in openings 40 and 41 in fixture 21. When platform 18 and fixture 21 are locked together, a pair of keys 42 and 43 on platform 18 engage respective guides 44 and 45 on fixture 21. Wheeled weapons skid 13, such as a Navy Aero 21A weapons skid, contains one or more items of ordnance 14, such as MK-81 bomb, which is attached by a pair of suspension lugs 47 and 48 to ejector rack 15. Ejector rack may be a multiple type, which provides carriage and individual release and ejection for up to six stores - three rocket packages of two rockets each, or three cluster bomb unit dispensers of two bombs each from a single aircraft pylon 17. Rack 15 is an elongated structural member which supports multiple, individual ejector unit assemblies (not shown). Each ejector unit assembly provides for ordnance carriage, sway bracing, and ordnance ejection through an electrically initiated ejection cartridge, and a manual release for removal of ordnance on the ground. A pair of tapered steel pins 49 and 50, which in the present embodiment have an average diameter of 1 inch and an effective length of 3 inches are demountably attached to the top of rack 15 adjacent opposite ends thereof with respective quick disconnect pins 51 and 52, or any equivalent means for rapid removal. A pair of lugs 53 and 54 are fixedly attached at the top of rack 15 adjacent pins 49 and 50 for final latching of rack 15 to bomb rack 16.

Bomb rack 16, which is a cartridge-actuated, electrically fired assembly capable of carrying and releasing a variety of stores, is mounted on pylon 17, and contains a pair of aligning cones 55 and 56 demountably attached to bomb rack 16 with quick-disconnect pins 57 and 58. Cones 55 and 56 are positioned on bomb rack 16 to accept respective pins 49 and 50. A pair of latches 59 and 60 are mounted on rack 16 adjacent cones 55 and 56 and are positioned to accept respective lugs 53 and 54 for final latching of ejector rack 15 to bomb rack 16. A pair of anti-sway braces 61 and 62 are mounted on rack 16 adjacent latches 59 and 60 for eliminating lateral roll of rack 15 containing ordnance 14 during flight.

Figure 3:
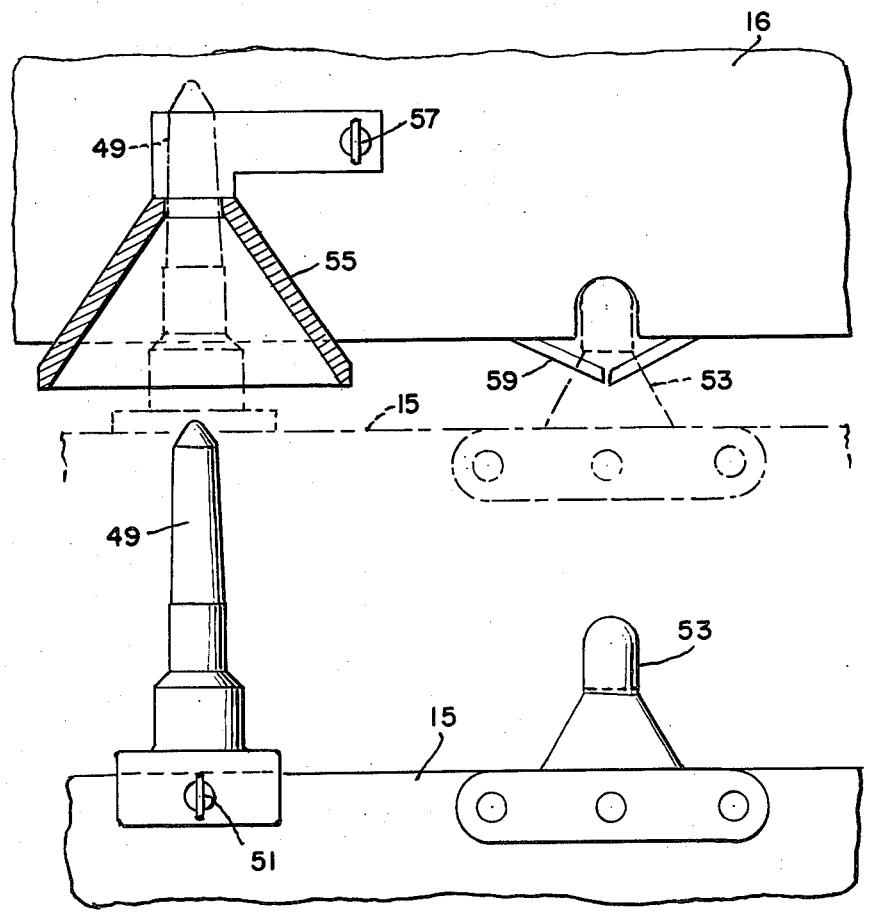
FIG. 3 is an enlarged side elevational view of the alignment and latching apparatus of FIG. 2.

Referring to FIG. 3, pin 49 and cone 55 are shown enlarged and in greater detail in an unlatched and a latched position. Final latching of lug 53 to latch 59 is also shown with greater particularity. Quick-disconnect pins 51 and 57 respectively secure pin 49 to ejector rack 15 and cone 55 to bomb rack 16 respectively.

Loading and final alignment of ordnance 14 to aircraft 10 is accomplished in the following manner with reference to FIGS. 1, 2 and 3. Pins 49 and 50 are attached to rack 15 by quick disconnect pins 51 and 52 in an ordnance assembly area prior to ordnance loading. Mating cones 55 and 56 are attached to rack 16 with quick disconnect pins 57 and 58, or any equivalent means for rapid removal, on pylon 17 in a preloading area on deck 11. Aircraft 10 is taxied to a predetermined position on flight deck 11 with pylon 17 directly above skid platform 18. Skid 13 is rolled into place on platform 18 beneath pylon 17, either manually or by a towing vehicle available on the carrier deck. Fixture 21 is adjusted for correct fore and aft pitch by energizing motor 32 through switch 34, moving rod 29 and link 26. Lateral roll and yaw are corrected by similar motor and linkage means (not shown). Fixture 21 must be so adjusted to correct for each aircraft configuration in order to insure smooth mating of pins 49 and 50 with respective cones 55 and 56, without creating excessive loading. Cylinders 23 and 24 are then actuated raising table 22 supporting fixture 21, bags 19 and 20 and platform 18. When pins 49 and 50 make initial contact with cones 55 and 56, vertical movement by cylinders 23 and 24 is halted. Bags 19 and 20 are then in a deflated condition and platform 18 and support fixture 21 are clamped together by locking devices 38 and 39. Locks 38 and 39 are thereupon released and bags 19 and 20 are slowly pressurized from an external low pressure air source. As bags 19 and 20 inflate, platform 18 separates from fixture 21, and pins 49 and 50 are slowly guided into the smooth interior surface of cones 55 and 56, and lugs 53 and 54 engage latches 59 and 60. Bags 19 and 20 provide sufficient lift necessary to force alignment between pins 49 and 50 and cones 55 and 56 without inducing excessive loads. Slight relative lateral motion can occur between bags 19 and 20 to allow slight lateral shifting of pins 49 and 50 in cones 55 and 56, thus avoiding excessive loading. After final latching of lugs 53 and 54 to latches 59 and 60 has been completed, tie downs between ordnance 14 and skid 13 are released, and bags 19 and 20 are deflated, dropping platform 18 into contact with fixture 21. The mating surfaces of platform 18 and fixture 21 are guided into position by respective indexing keys 42 and 43 and guides 44 and 45 and are locked together by locking devices 38 and 39. It is to be understood that within the spirit and scope of the present invention, multiple ordnance loading can be accomplished simultaneously in a similar manner by placing a plurality of the apparatus hereindescribed side by side under the particular number of pylons contained by the aircraft being loaded. Aircraft 10 is then taxied to the postloading area where ordnance checkout is performed, pins 49 and 50 and cones 55 and 56 are removed, and final electrical and arming procedures are initiated.

The invention has thus been described in the environment of an aircraft carrier rearming station. It is to be understood that the loading and final alignment concept described herein may also be used with existing and proposed mobile aircraft weapons loaders for loading ordnance at stationary airfields. Some of the many advantages of the novel loading and and final alignment apparatus described include elimination of the requirement for precise visual alignment of the weapons loader and elimination of the need for manual final alignment and latching of weapons stores to aircraft. These advantages result in increased speed and volume of ordnance loading, greatly reducing aircraft rearming and thus turnaround time. Safety is greatly increased and personnel requirements are dramatically decreased. These and other advantages should now be readily apparent from the foregoing description.

Obviously, many modifications and variations of the present invention are possible in light of the above teachings. It is therefore to be understood that within the scope of the appended claims the invention may be practiced otherwise than as specifically described.

What is claimed is:

1. In combination with ordnance loading apparatus of the type wherein lifting means cooperate with elongated ordnance receiving means for raising ordnance into position for final attachment of lugs mounted on the receiving means to latches mounted on ejector means attached to an aircraft, the improvement which comprises:

pin means detachably mounted on the receiving means;

receptacle means detachably mounted on the ejector means and having a conical opening for receiving said pin means, the positions of said pin and receptacle means being the same relative to the lugs and latches of the receiving and ejector means respectively;

skid means formed to rigidly support and transport the ordnance to the aircraft; and means pivotally connected to the lifting means having a surface for supporting the skid and the ordnance and including inflatable bag means for selectively imparting a vertical force to said surface whereby said pin means enters said receptacle means and guides the ordnance into final alignment with the aircraft for engaging the corresponding lugs and latches.

2. An improvement in ordnance loading apparatus as set forth in claim 1 wherein said pin means further comprises:

a pair of elongated members disposed adjacent opposite ends of the ordnance receiving means.

3. An improvement in ordnance loading apparatus as set forth in claim 2 wherein said receptacle means further comprises:

a pair of conical members formed to receive said elongated members.

4. An improvement in ordnance loading apparatus as set forth in claim 3 further comprising:

said elongated members and said conical members being detachably mounted to the ordnance receiving means and the ejector means respectively with quick-disconnect means.

5. Apparatus for providing final alignment and latching of a first member to a second member, said members having interlatching elements, comprising in combination:

pin means formed to be mounted on one of the members;

conical receptacle means formed to be mounted on the other of said members for receiving said pin means, the corresponding positions of said pin and receptacle means being the same relative to the interlatching elements;

transport means formed to rigidly support and transport the first member to the second member; and inflatable bag means formed to support said transport means and the first member for selectively imparting a vertical force thereto whereby said pin means enters said receptacle means and guides the first member until interlatching elements engage.

6. Final alignment and latching apparatus as set forth in claim 5 wherein said pin means further comprises:

a pair of elongated members disposed adjacent opposite sides of said first member.

7. Final alignment and latching apparatus as set forth in claim 6 wherein said receptacle means further comprises:

a pair of conical members formed to receive said elongated members.

8. Final alignment and latching apparatus as set forth in claim 7 further comprising:

said elongated members and said conical members being detachably mounted to the first and second members respectively with quick disconnect means.

* * * * *